(No Model.)

W. T. KING.
Cotton and other Seed Planters.

No. 231,054.  Patented Aug. 10, 1880.

Witnesses:
P. L. Ouraud
C. L. Evert

Inventor:
W. T. King
By Alexander T. Mason
Attys.

N. PETERS, PHOTO-LITHOGRAPHER, WASHINGTON, D. C.

UNITED STATES PATENT OFFICE.

WILLIAM T. KING, OF WELLBORN'S MILLS, GEORGIA.

COTTON AND OTHER SEED PLANTER.

SPECIFICATION forming part of Letters Patent No. 231,054, dated August 10, 1880.

Application filed July 9, 1880. (No model.)

*To all whom it may concern:*

Be it known that I, WILLIAM T. KING, of Wellborn's Mills, in the county of Houston, and in the State of Georgia, have invented certain new and useful Improvements in Cotton and other Seed Planters; and I do hereby declare that the following is a full, clear, and exact description thereof, reference being had to the accompanying drawings, and to the letters of reference marked thereon, making a part of this specification.

The nature of my invention consists in the construction and arrangement of a seed-planter, as will be hereinafter more fully set forth.

In order to enable others skilled in the art to which my invention appertains to make and use the same, I will now proceed to describe its construction and operation, referring to the annexed drawings, in which—

Figure 1:
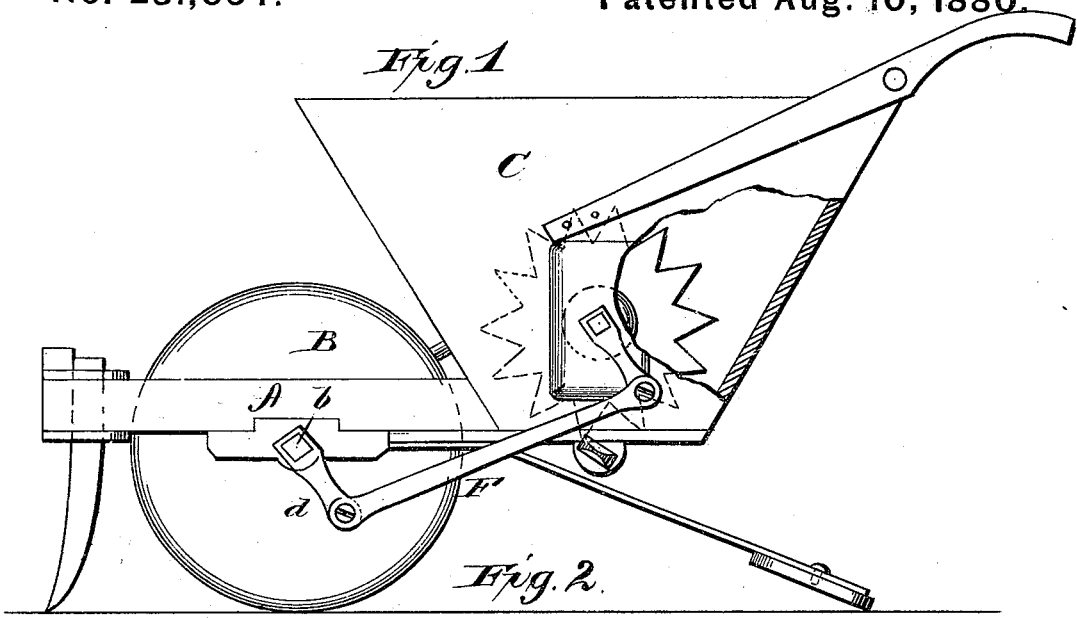
Figure 2:
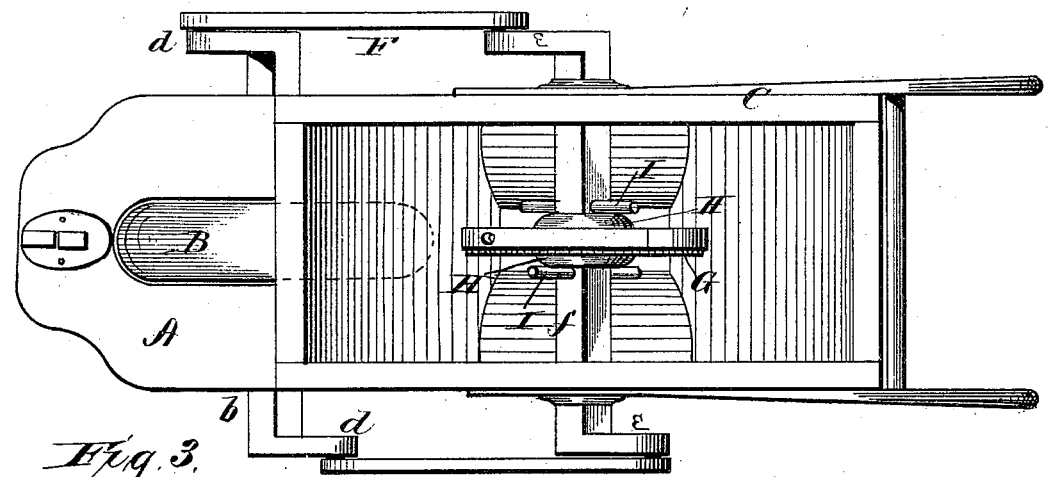
Figure 3:
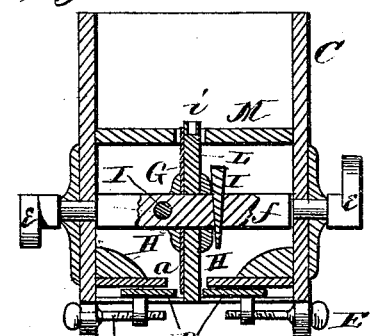
Figure 4:
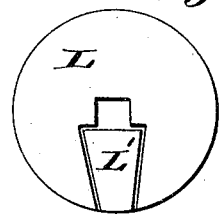

Figure 1 is a side view of my machine. Fig. 2 is a plan view of the same. Fig. 3 is a cross-section thereof, and Fig. 4 is a detail view.

A represents the frame of my planter, which consists of suitable planks, forming a center opening for the wheel B, and having the hopper C secured upon its rear portion.

In the bottom of the hopper is an enlarged opening, $a$, which is regulated as to its width by means of two slides, D D, one on each side. These slides fit in suitable guides, and are adjusted laterally by means of screws E E, as shown in Fig. 3, for making the opening $a$ wider or narrower, as desired.

The wheel B is mounted upon a shaft, $b$, which has a crank, $d$, at each end, the two cranks being set about ninety degrees apart, and, by pitmen F F, connected to similar cranks $e$ $e$ on a shaft, $f$, that passes through the hopper. The center portion of the shaft $f$ is made square, and upon the same is placed a toothed wheel, G, which is held by means of washers H H and pins I I, the said pins passing through holes in the shaft. This toothed wheel is intended for agitating the cotton-seed and causing it to pass through the opening $a$ in the bottom of the hopper.

When it is desired to plant pease, a wooden wheel, L, is placed on the shaft $f$ at the side of the toothed wheel G, said wheel having in its periphery a series of pockets, $i$, to receive and carry the pease. These pockets may be of any desired size to plant more or less in each hill, and also any desired distances apart to plant the hills at the proper intervals.

The pea-dropping wheel L is formed with a removable dovetailed section, L', as shown in Fig. 4. This section is removed when it is desired to put on the wheel, which then slips over the shaft, and the section L' is then put back, when, by means of the washers and pins, the parts are held in proper place.

When this wheel L is used a slotted horizontal partition, M, is placed in the hopper at such a point that the wheel will just project above the upper surface of said partition to receive the pea-seed in the pockets $i$, as shown in Fig. 3.

Having thus fully described my invention, what I claim as new, and desire to secure by Letters Patent, is—

1. In combination with the shaft $f$, having perforations, as described, the washers H H and pins I I, the wheel L, adapted to be secured to said shaft, and the partition M, substantially as and for the purposes set forth.

2. The dropping-wheel L, having seed-pockets $i$, and provided with the removable dovetailed section L', in combination with the shaft $f$, washers H, and pins I, substantially as and for the purposes herein set forth.

In testimony that I claim the foregoing I have hereunto set my hand this 5th day of July, 1880.

WILLIAM T. KING.

Witnesses:
T. G. HOLT,
C. M. ALEXANDER.